United States Patent
Sinelli

[11] Patent Number: 5,879,049
[45] Date of Patent: Mar. 9, 1999

[54] DEVICE FOR ACTUATING A SUN-ROOF OF MOTOR VEHICLES AND THE LIKE

[75] Inventor: Edoardo Sinelli, Milan, Italy

[73] Assignee: Autotek S.r.l., Carugo, Italy

[21] Appl. No.: 891,784

[22] Filed: Jul. 14, 1997

[30] Foreign Application Priority Data

Jul. 16, 1996 [IT] Italy ................................. MI96A1472

[51] Int. Cl.$^6$ .................................................. B60J 7/047
[52] U.S. Cl. ...................... 296/223; 296/216.03; 296/224
[58] Field of Search .................................. 296/216, 223, 296/224

[56] References Cited

U.S. PATENT DOCUMENTS

| | | | |
|---|---|---|---|
| 4,630,860 | 12/1986 | Fuerst et al. ............................ | 296/217 |
| 4,647,106 | 3/1987 | Furst ....................................... | 296/223 |
| 5,405,185 | 4/1995 | Cheron et al. .......................... | 296/223 |

Primary Examiner—Dennis H. Pedder
Attorney, Agent, or Firm—Guido Modiano; Albert Josif

[57] ABSTRACT

A device for actuating a sun-roof of motor vehicles and the like, which comprises a frame which can be fixed at an opening provided in the roof of motor vehicles and the like. The frame forms two mutually opposite guiding rails. The device comprises, for each guiding rail, a slider which can be associated with translatory motion means for its sliding in the corresponding rail and is provided with two mutually spaced lateral pins which can engage two cam-like slots provided on a bracket for supporting the sheet-like element that can be arranged so as to close the opening. There is also provided a plate which is articulated to the bracket and is actuated by the slider in order to place the plate in a position for coupling to the frame, wherein the sliding of the slider causes the rotation of the sheet-like element, and in a movement position, in which the sliding of the slider causes the translatory motion of the sheet-like element arranged at an angle.

6 Claims, 3 Drawing Sheets

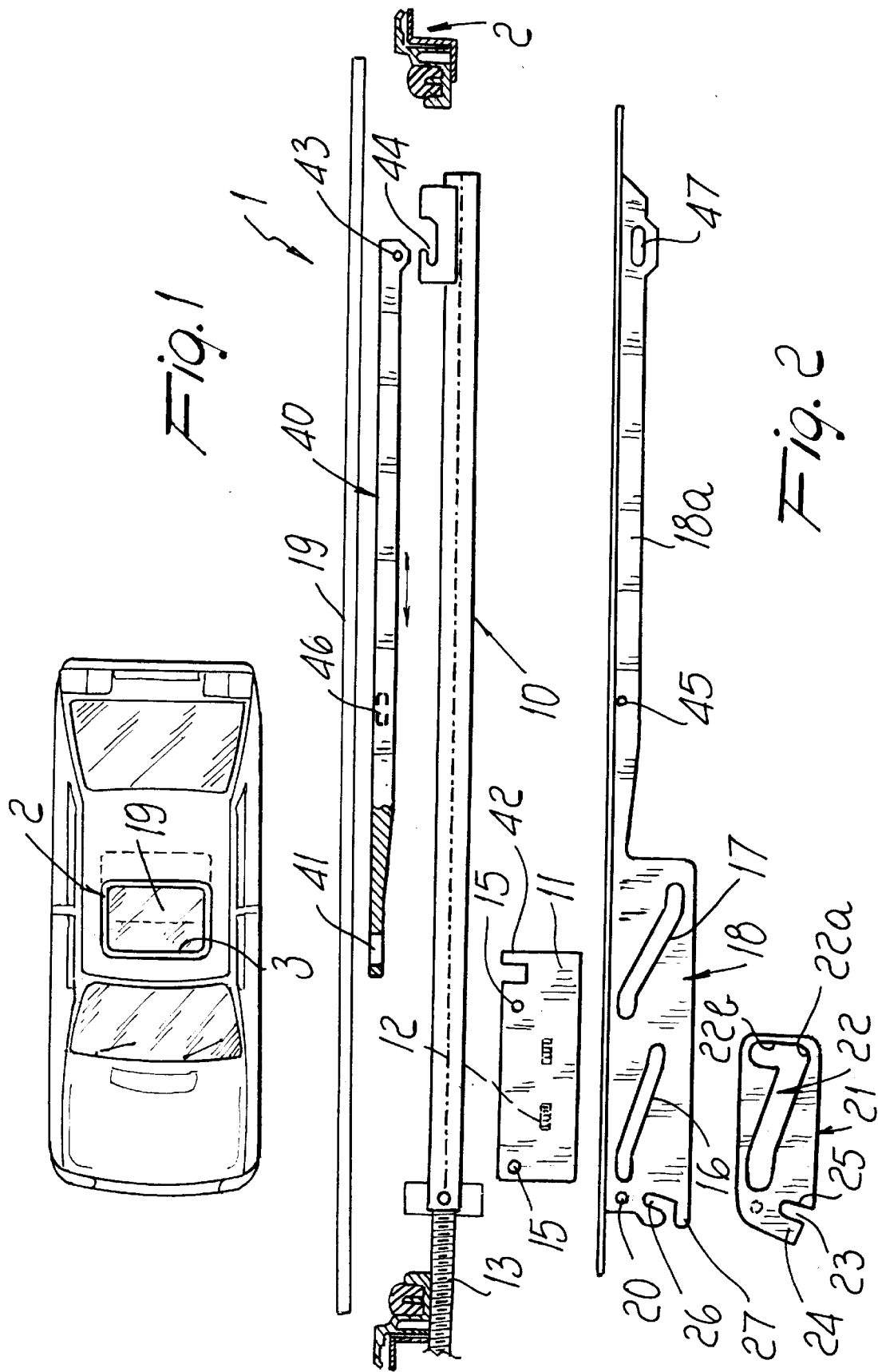

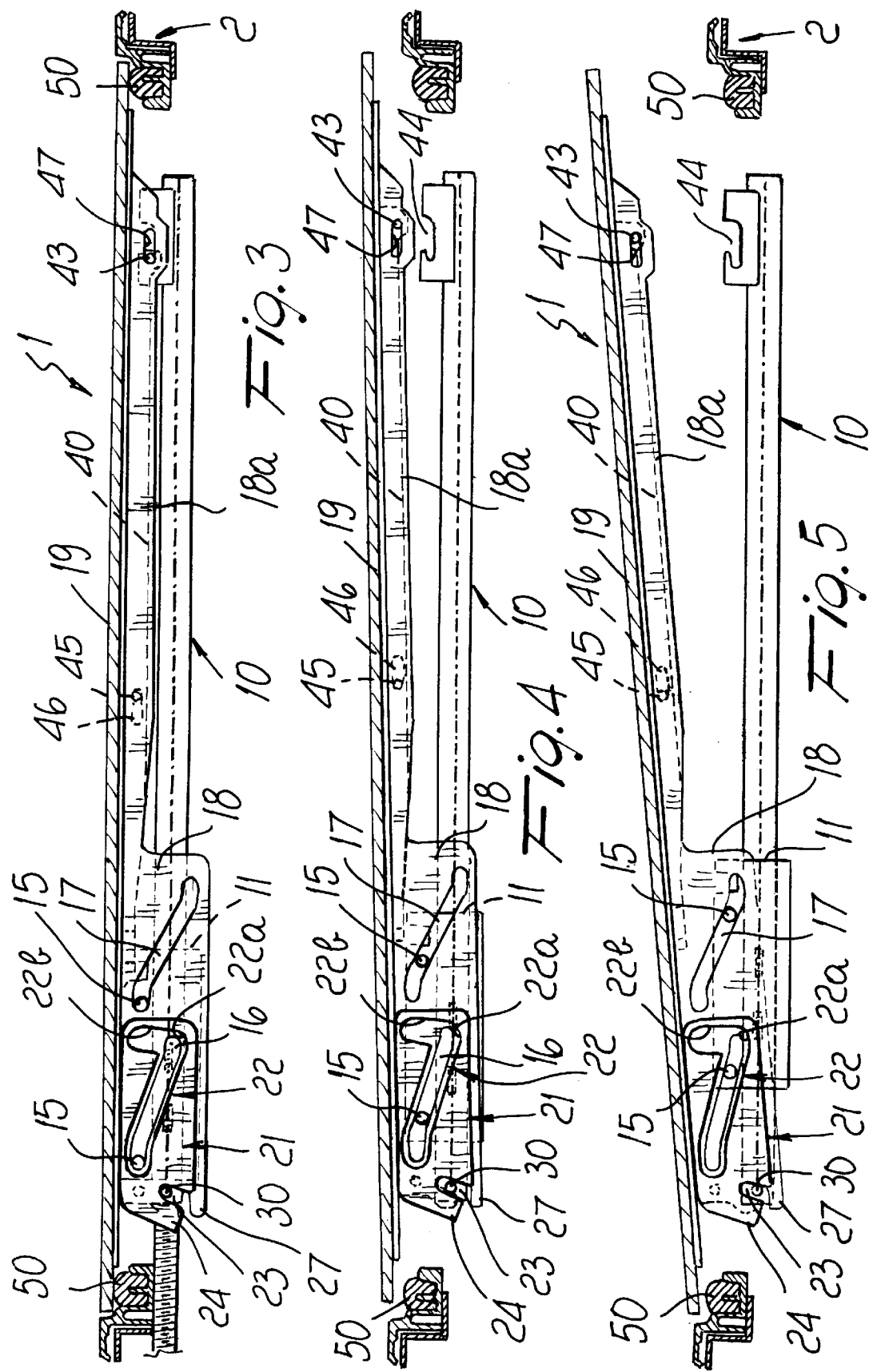

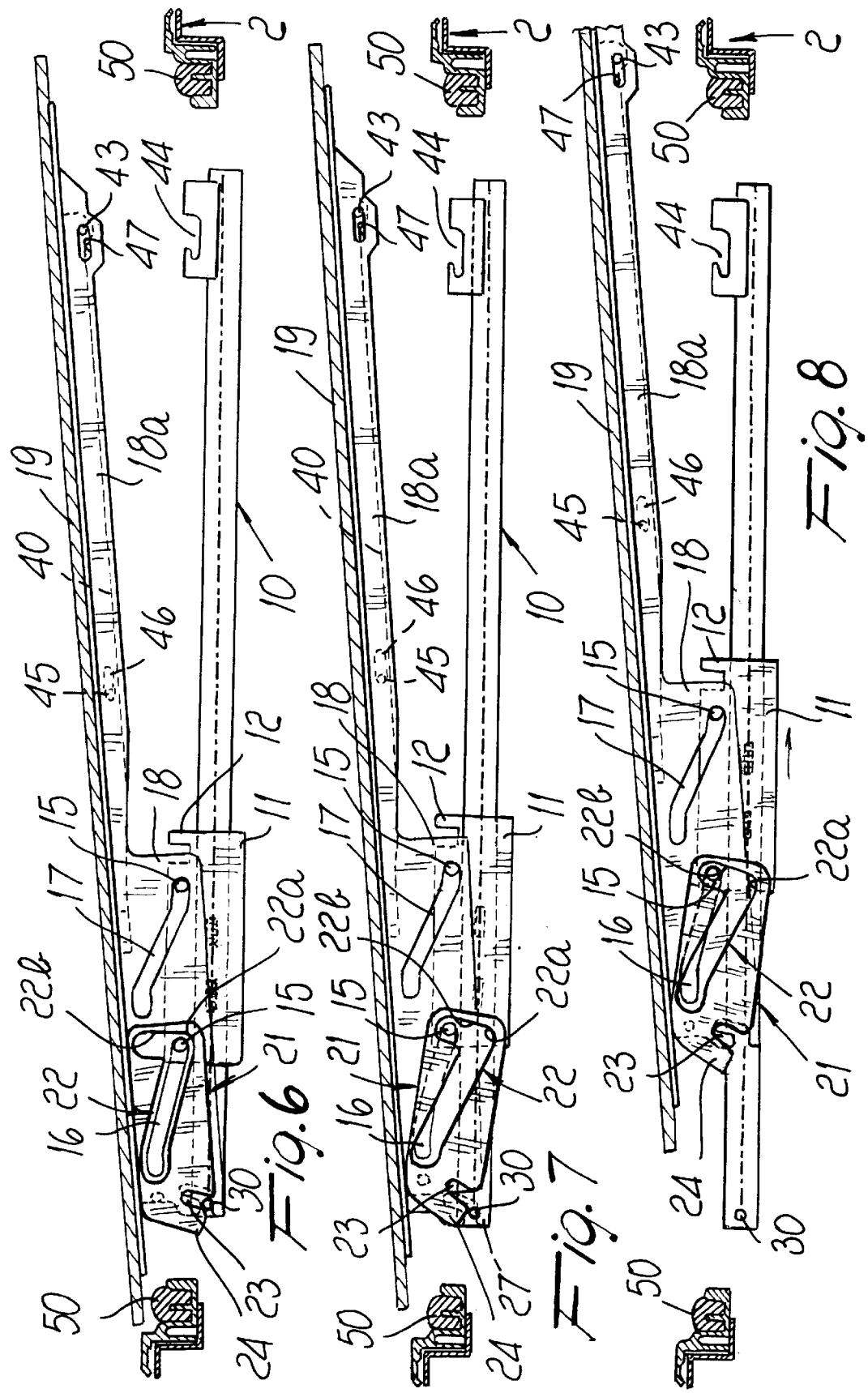

DEVICE FOR ACTUATING A SUN-ROOF OF MOTOR VEHICLES AND THE LIKE

BACKGROUND OF THE INVENTION

The present invention relates to a device for actuating a sun-roof of motor vehicles and the like.

Current commercially available sun-roofs for motor vehicles allow to perform, when the sun-roof is actuated, an initial step of oscillation of the sun-roof, which is arranged at an angle by lifting the part directed towards the rear region of the motor vehicle. The sun-roof can also optionally be made to slide so as to at least partially open the upper opening.

To perform closure, the above-described movements are of course performed in reverse.

These conventional solutions have generally proved themselves very complicated, both because they require the assembly of a considerable number of components and because their actuation is not easy.

Among conventional solutions, mention is made of those in which a frame is provided which is located at the opening of the roof and forms two mutually opposite rails in which a first and a second sliding elements for each rail can slide. A bracket is pivoted to one of the sliding elements and supports the sun-roof, and there is provided an opening lever which is pivoted to the sliding element at one end and to the bracket at the other end, whilst in a median portion it has a pivot which engages the other guiding element.

With this arrangement, rotation is performed through the mutual sliding of the sliding elements, whilst translatory motion during opening and closure is obtained by keeping the two sliding bodies or elements mutually close by means of locking devices which are structurally very complicated.

Another typical drawback of the solutions of the prior art is constituted by the fact that the components have a considerable bulk in terms of width, which thus significantly limits the useful region for the application of the sheet-like element that forms in practice the sun-roof closure element.

SUMMARY OF THE INVENTION

The aim of the present invention is to eliminate the above drawbacks by providing a device for actuating a sun-roof which allows to obtain both the rotation or oscillation of the sun-roof and its translatory motion by using a very small number of components.

Within the scope of this aim, a particular object of the invention is to provide a device which while being structurally very simple allows to automatically obtain a sequence of operations which occur without jamming problems or hindrances of any kind.

Another object of the present invention is to provide a device which can be actuated both manually and by means of a motorization system, maintaining in any case considerable constructive simplicity.

Another object of the present invention is to provide a device for actuating a sun-roof which can be easily obtained starting from commonly commercially available elements and materials and is furthermore competitive from a merely economical point of view.

This aim, these objects and others which will become apparent hereinafter are achieved by a device for actuating a sun-roof of motor vehicles and the like, according to the invention, which comprises a frame which can be fixed at an opening provided in the roof of a motor vehicle and the like, said frame forming two mutually opposite guiding rails, comprising, for each guiding rail, a slider which can be associated with translatory motion means for its sliding in the corresponding rail and is provided with two mutually spaced lateral pins which can engage two cam-like slots provided on a bracket for supporting the sheet-like element that can be arranged so as to close said opening, a plate being furthermore provided which is articulated to said bracket and is actuated by said slider in order to place said plate in a position for coupling to said frame, wherein the sliding of said slider causes the rotation of said sheet-like element, and in a movement position, in which the sliding of said slider causes the translatory motion of said sheet-like element arranged at an angle.

BRIEF DESCRIPTION OF THE DRAWINGS

Further characteristics and advantages of the present invention will become apparent from the following detailed description of a preferred but not exclusive embodiment of a device for actuating a sun-roof in motor vehicles and the like, illustrated only by way of non-limitative example in the accompanying drawings, wherein:

FIG. 1 is a schematic top plan view of a sun-roof applied to a motor vehicle;

FIG. 2 is an exploded view of the device according to the invention;

FIG. 3 is a transverse sectional view of the device in closed position;

FIG. 4 is a sectional view of the device during the initial step of the rotation of said sheet-like element;

FIG. 5 is a view of the device in a step of intermediate inclination;

FIG. 6 is a view of the device in the fully inclined position;

FIG. 7 is a view of the device at the beginning of the step for the translatory motion of the sheet-like element;

FIG. 8 is a view of the translatory motion of the sheet-like element.

DESCRIPTION OF THE PREFERRED EMBODIMENTS

With reference to the above figures, the device for actuating a sun-roof of motor vehicles and the like, according to the invention, generally designated by the reference numeral 1, comprises a substantially rectangular frame 2 which can be fixed at an opening provided on a roof 3 of a motor vehicle and the like.

The frame 2 forms, at the edges that are longitudinal with respect to the direction of the vehicle, two mutually opposite guiding rails generally designated by the reference numeral 10.

A slider 11 is arranged in each guiding rail 10; in the specific embodiment, the slider is constituted by a substantially rectangular plate provided with coupling elements 12 which are connected for example to a coiled cable 13 which is made to perform a translatory motion and causes the translatory motion of the slider 11 within the rail 10.

The coiled cable 13 can be actuated manually or through the motor means.

Two lateral pins 15 are provided on the slider 11; these pins respectively engage a first cam-like slot 16 and a second cam-like slot 17 formed in a supporting bracket 18 of a sheet-like element 19 that can be arranged so as to close the opening of the roof.

The two cam-like slots 16 and 17 are arranged at an angle with respect to the longitudinal extension of the bracket 18 and have mutually different inclinations, so that the engagement of the pins 15 in the slots 16 and 17 lifts the bracket 18 and tilts it, as shown in FIGS. 4 and 5.

A plate 21 is articulated to the bracket 18 by means of a pivot 20 and forms an L-shaped slot 22 in which the forward pin 15 engages.

The plate 21 also forms, at its front end with respect to the travel direction of the vehicle, an inclined hollow 23 which is delimited by a protrusion 24 at the front and by an abutment surface 25 at the rear. A fixed pivot 30 detachably engages the hollow 23 and is located substantially at the beginning of the guiding rail 10.

Likewise, the bracket 18 has an inclined seat 26 which is open at the front and is delimited in a downward region by a resting portion 27, which in practice limits the lifting of the bracket 18 during the translatory motion of the slider 11, which, by means of its pins 15, causes the bracket 18 to perform a translatory motion and tilt.

There is also provided a locking traction element 40, which is slidingly supported by the wing 18a of the supporting bracket 18 and is provided at the front with an opening 41 which can detachably engage a tab 42 formed by the slider 11 and has, at the rear, an engagement pin 43 which enters an engagement seat 44 formed at the rear end of the rail 10.

The traction element 40 is slidingly supported on the wing 18a through the engagement of a pin 45 of the wing 18a in an elongated slot 46 formed on the traction element and through the engagement of the locking pin 43 in a rear slot 47 formed on the wing 18a.

In practical operation, when the sheet-like element 19 is in closed position, FIG. 3, the slider 11 is in its initial position; in this condition, the sheet-like element 19 is kept pressed against the gasket 50, which is supported by the frame 2.

The sheet-like element is in the locking position, since the opening 41 of the traction element 40 is coupled to the tab 42, which pulls it forward, overcoming the contrast of the return springs provided therein, keeping the engagement pins 43 coupled to the seat 44 rigidly coupled to the guiding rail 10.

In this position, the fixed pin is retained inside the inclined recess 23 and is also located inside the seat 26.

When the translatory motion of the slider 11 begins, an upward movement step is performed through the engagement of the pins 15 in the cam-like slots 16 and 17, causing the disengagement of the tab 42 from the opening 41, with consequent disengagement of the pin 43 from the seat 44 for the return of the traction element, which is caused by an elastic return device.

As the translatory motion of the slider 11 continues, FIGS. 5 and 6, the different inclination of the slots 16 and 17 causes in practice the rotation of the supporting bracket 18 and accordingly of the sheet-like element 19 supported thereby.

In this step, the forward pin 15 passes through the L-shaped slot of the plate 21 until, once it has arrived at the vertex region 22a, the plate rotates downward with reference to the drawings and the protrusion 24 in practice disengages from the fixed pin 30.

Likewise, the upward movement of the bracket 18 has caused the fixed pin to engage the portion 27 of the seat 26, so that the connection between the supporting bracket 18 and the fixed pin ceases and the further translatory motion of the slider 11 leads to a translatory motion of the bracket 18 as well, also owing to the fact that the downward oscillation of the plate 21 has made the arm 22b engage the first one of the pins 15 and has consequently rigidly coupled the slider 11 and the supporting bracket 18 in their motion.

The translatory motion can continue up to the rear end, producing the intended translatory motion of the sheet-like element which in practice opens the opening.

In order to perform closure, it is sufficient to perform the above-described operations in reverse; in particular, the slider 11 is caused to perform a translatory motion until the abutment wall 25 of the plate engages the fixed pin 30, accordingly producing the rotation of the plate 21 in the opposite direction and consequently positioning the front pin 15 in the corner region 22 and inserting the pin 30 in the inclined seat 26.

The rotation of the plate causes the fixed pin 30 to practically fit inside the inclined slot 23; accordingly, since the translatory motion of the bracket 18 is no longer possible, the additional translatory motion of the slider 11 causes the rotation of the sheet-like element in the opposite direction and the sheet-like element is arranged in the closure position.

When the step of translatory motion of the slider 11 has practically ended, the tab 42 enters the opening 41 of the traction element 40 and pulls said traction element so as to insert the coupling pin 43 inside the hook-shaped seat 44, locking and clamping the sheet-like element against the gaskets.

From the above description it is thus evident that the invention achieves the intended aim and objects, and in particular the fact is stressed that a device is provided which is obtained by means of a very small number of components which, by having a plate-like configuration and being arranged side by side, allow to occupy very compact spaces in terms of width, so that they do not hinder the region affected by the sheet-like element.

The invention thus conceived is susceptible of numerous modifications and variations, all of which are within the scope of the inventive concept.

All the details may furthermore be replaced with other technically equivalent elements.

In practice, the materials employed, as well as the contingent shapes and dimensions, may be any according to requirements.

What is claimed is:

1. A device for actuating a sun roof of motor vehicles and the like, comprising:

a frame for fixing at an opening provided in a roof of a motor vehicle and the like, said frame forming two mutually opposite guiding rails, comprising, for each guiding rail, a slider associated with translatory motion means for its sliding in the corresponding rail and is provided with two mutually spaced lateral pins adapted to engage two cam-like slots provided on a bracket which supports a sheet-like element adapted to close said opening, and a plate articulated to said bracket by means of said slider and a pivot;

the coupling of said plate to the bracket occurring at a forward edge of said slider;

said plate being provided with a cam-like slot in which one of said lateral pins engages.

2. The device according to claim 1, wherein said slider is substantially flat and said cam-like slot of the plate is L-shaped.

3. The device according to claim 1, wherein said cam-like slots are constituted by two slots which are inclined with respect to a longitudinal arrangement of the bracket at mutually different angles so as to generate a rotation of said bracket when said pins are moved in said slots.

4. The device according to claim 1, wherein said plate has, at its front end with respect to the travel direction of the vehicle, an inclined recess which is delimited by a protrusion at the front and by an abutment surface at the rear, a fixed pin arranged at the beginning of said guiding rail detachably engaging said inclined recess.

5. The device according to claim 4, wherein said bracket has an inclined seat which is open at the front and is delimited in a downward region by a resting portion, said fixed pin engaging said inclined seat.

6. The device according to claim 1, further comprising a locking traction element which is slidingly supported by a wing of said bracket and is provided, in a front region, with an opening which can detachably engage a tab formed by said slider and is provided, in a rear region, with an engagement pin which can be inserted in an engagement seat formed at the rear end of said rail.

\* \* \* \* \*